United States Patent Office.

JOHN RESTLE, OF BOSTON, MASSACHUSETTS.

Letters Patent No. 108,829, dated November 1, 1870.

IMPROVEMENT IN TRANSPARENT VARNISHES.

The Schedule referred to in these Letters Patent and making part of the same.

To all whom it may concern:

I, JOHN RESTLE, of Boston, in the county of Suffolk and State of Massachusetts, have invented a certain new and useful Compound for Transparent Varnish, of which the following is a specification.

My invention consists in the discovery of a new compound to be used as a transparent varnish.

My improved varnish is compounded as follows:

First, I dissolve four ounces of shellac in one pint of high-proof alcohol; to this I add one-half ounce of pulverized gum sandarach and one-half ounce of pulverized gum elemi.

Second, I mix two ounces of pulverized gum copal in alcohol to make a thick sirup.

Third, I mix the first and second compounds together, and add to this new compound four ounces of the oil of lavender and an ounce of the spirits of turpentine, and thoroughly mix the whole by agitation.

I claim as my invention—

The varnish, when compounded of the ingredients, substantially as described and for the purpose set forth.

JOHN RESTLE.

Witnesses:
WILLIAM EDSON,
FRANK G. PARKER.